United States Patent [19]
Lindee

[11] Patent Number: 5,036,756
[45] Date of Patent: Aug. 6, 1991

[54] FOOD PRODUCT CRIMPING MECHANISM

[75] Inventor: Scott A. Lindee, New Lenox, Ill.

[73] Assignee: Formax, Inc., Mokena, Ill.

[21] Appl. No.: 516,821

[22] Filed: Apr. 30, 1990

[51] Int. Cl.$^5$ .............................................. A21C 9/04
[52] U.S. Cl. ................................. 99/450.4; 99/450.2; 99/450.6; 426/513; 426/121
[58] Field of Search ............ 99/450.2 R, 450.4, 450.6; 17/32; 426/556, 574, 121, 513

[56] References Cited

U.S. PATENT DOCUMENTS

| Re. 30,096 | 9/1979 | Richards et al. | 17/32 |
|---|---|---|---|
| 3,388,675 | 6/1968 | Marshall et al. | 99/450.6 |
| 3,782,270 | 1/1974 | Sollerud | 99/450.4 |
| 3,782,271 | 1/1974 | Tobey et al. | 99/450.6 |
| 3,869,975 | 3/1975 | Seewer | 99/450.2 |
| 4,054,967 | 10/1977 | Sandberg et al. | 17/32 |
| 4,138,768 | 2/1979 | Roth | 17/32 |
| 4,170,933 | 10/1979 | Meamber | 99/349 |
| 4,182,003 | 1/1990 | LaMartino et al. | 17/32 |
| 4,356,595 | 11/1982 | Sandberg et al. | 17/45 |
| 4,608,918 | 9/1986 | Funabashi et al. | 99/450.4 |
| 4,684,040 | 8/1987 | Jonovic et al. | 222/148 |
| 4,697,308 | 10/1987 | Sandberg | 17/32 |
| 4,709,449 | 12/1987 | Borsuk | 17/32 |
| 4,714,014 | 12/1990 | Hartl et al. | 99/450.2 |
| 4,716,821 | 1/1988 | Mally et al. | 99/450.1 |
| 4,740,129 | 4/1988 | Sponseller | 99/450.4 |
| 4,768,260 | 9/1988 | Sandberg | 17/32 |

FOREIGN PATENT DOCUMENTS

1183374 4/1970 United Kingdom ............... 99/450.2

Primary Examiner—Frederick R. Schmidt
Assistant Examiner—Lawrence Cruz
Attorney, Agent, or Firm—Kinzer, Plyer, Dorn, McEachran & Jambor

[57] ABSTRACT

A cyclic crimping mechanism for producing coherent plural-layer food products from food assemblies, each food assembly including a bottom patty covered by a top patty (other patties, food slices, or condiments are usually positioned between the top and bottom patties), uses a cyclically, intermittently actuated conveyor to locate each food assembly at a crimping position for a predetermined crimping interval; in sequence, a confinement tool is moved down to an actuated position to define peripheral limits for the food product, a tamping tool is pressed down onto the food assembly to reduce air entrapment, and a crimping tool presses the periphery of the top patty into the bottom patty to seal them together in a coherent food product, after which these tools are all elevated to rest positions clear of the crimping position and the conveyor operates to move the finished food product away and position a new food assembly at the crimping position to start the crimping cycle anew. The crimping tool may include pins that pierce the central part of the food assembly for additional air release.

33 Claims, 4 Drawing Sheets fig.5.

FOOD PRODUCT CRIMPING MECHANISM

BACKGROUND OF THE INVENTION

There is appreciable interest in production of food products having two, three, four or more ingredients; the food product usually includes a bottom food patty of a food material (e.g., chicken, turkey, pork, or veal) covered by a top food patty of the same or a different material. One or more additional ingredients, most often somewhat smaller than the top and bottom patties, are usually interposed between those patties. Typical products of this kind utilize chicken or turkey meat for the outer patties, with cheese, ham, stuffing, or condiments for the middle layer ingredients. A variety of other similar products are possible, including fish with crab or other stuffing as the middle ingredient, and beef or other meat with a variety of ingredients in the center of the food product. In any of these products, the top and bottom patties should be sealed together to afford a coherent plural-layer food product.

There are a number of high efficiency, high volume food patty molding machines that have been utilized for production of hamburger patties, other ground meat patties, chicken patties, fish patties, imitation steaks, and other molded food products. Four such machines that are commercially available are described in Richards et al. U.S. Pat. No. Re. 30,096, Sandberg et al. U.S. Pat. No. 4,054,967, LaMartino et al. U.S. Pat. No. 4,182,003 and Sandberg U.S. Pat. No. 4,768,260; these machines are available as the F26, F-19, F-12 and F-6 food patty molding machines, respectively, made and sold by Formax Inc. of Mokena, Ill., U S A.

All of these high volume food patty molding machines are relatively flexible and each can produce a wide variety of food patties, depending upon the mold plate configuration and other mold station components in the machine. All can be used to produce molded food patties of whole muscle fiber, using the molding apparatus of Sandberg et al. U.S. Pat. No. 4,356,595 or Sandberg U.S. Pat. No. 4,697,308. However, these machines do not directly manufacture food products having two or more ingredients; additional equipment is required. This applies also to other food patty molding machines, particularly those that, like the machines identified above, use a reciprocating mold plate.

One known system for producing plural-layer food products uses two of the Formax F-19 patty molding machines of Sandberg U.S. Pat. No. 4,054,967, with one of those machines modified for a pass-through operation. That system deposits cheese, ham, condiments, or other ingredients onto a series of bottom food patties to form multi-layer food subassemblies on a continuously moving belt conveyor. A second, modified patty machine is used to deposit a top patty on each multi-layer subassembly to complete a food assembly, followed by a mechanism for "knitting" each assembly together to complete the food product. The system and its components are disclosed in a series of United States Patents of Oscar Mayer Foods Corporation; those U.S. patents are Jonovic et al. No. 4,684,040, Borsuk No. 4,709,449, Hartl et al. No. 4,714,014, and Mally et al. No. 4,716,821 and No. 4,832,970.

Maintaining registry between sequential plural layers of a food assembly, on a continuously moving conveyor, is quite difficult. The least variation in timing sequence for any part of the system is likely to produce an unacceptable end food product due to misalignment of layers of that product. A "knitting" mechanism that relies on multiple piercing operations to join two superimposed food patties, as in the previously discussed system, is likely to be unreliable whenever misalignment occurs; it is also difficult to attain reliable, consistent operation of equipment of this kind when working on the fly, with a continuously moving conveyor. Further, it may be noted that equipment on the Oscar Meyer line is all driven mechanically through a common drive shaft that limits flexibility of changes, additions, or deletions of equipment. Electronic sequencing is much preferable.

SUMMARY OF THE INVENTION

It is a principal object of the present invention, therefore, to provide a new and improved food product crimping apparatus for producing coherent, plural-layer food products from food assemblies of the kind comprising to and bottom food patties, usually with additional ingredients between them, that is capable of consistent, effective, efficient, high volume production.

Another object of the invention is to provide a new and improved food product crimping mechanism for a system that assembles and completes a plural-layer food product that can be utilized in conjunction with a wide variety of different food ingredients and that functions effectively with a cyclically, intermittently actuated conveyor.

A specific object of the invention is to provide a new and improved food product crimping mechanism that is relatively simple and inexpensive in construction yet efficient and long lasting in operation.

Accordingly, one aspect of the invention relates to a crimping mechanism for a crimping station producing a coherent plural-layer food product from a food assembly, the food assembly including at least a bottom food patty and a top food patty covering and supported by the bottom food patty, each patty formed of meat, poultry, or fish; the mechanism comprises intermittently operable food assembly positioning means for positioning a food assembly in a crimping position in the crimping station and maintaining the food assembly stationary in that crimping position for a predetermined crimping interval, confinement means for defining peripheral limits for a food product at the crimping position, the confinement means comprising a confinement tool movable between a rest position displaced from the crimping position and an actuated position encompassing the crimping position, crimping means for crimping peripheral portions of the top and bottom food patties of the food assembly together, at the crimping position, the crimping means comprising a crimping tool movable between a rest position displaced from the food assembly crimping position and an actuated position in which the crimping tool engages a peripheral portion of the top surface of the top food patty in pressure contact and presses that peripheral portion of the top food patty into the bottom food patty with no penetration of the crimping tool into the interior of either patty, and drive means for driving the confinement and crimping tools from their rest positions to their actuated positions and back to their rest positions during the crimping interval.

In another aspect the invention relates to a crimping mechanism for a crimping station producing a coherent plurallayer food product from a food assembly, the food assembly including at least a bottom food patty and a top food patty covering and supported by the bottom food patty, each formed of meat, poultry, or fish; the mechanism comprises a fixed base, located at the crimping station, intermittently operable food assembly positioning means for positioning a food assembly in a crimping position on the crimping station base and maintaining the food assembly stationary in that crimping position for a predetermined crimping interval, the food assembly positioning means comprising a cyclically driven belt-type conveyor extending across the base through the crimping station, a fixed frame member positioned above the crimping position in the crimping station, and a yoke, suspended from the frame member and movable toward and away from the crimping position. Confinement means are provided for defining peripheral limits for a food product at the crimping position, the confinement means comprising a confinement tool suspended from the yoke and movable toward and away from the base between a rest position displaced from the crimping position and an actuated position encompassing the crimping position; there are also crimping means for crimping peripheral portions of the top and bottom food patties of the food assembly together, at the crimping position, the crimping means comprising a crimping tool suspended from the yoke and movable toward and away from the base between a rest position displaced from the food assembly crimping position and an actuated position in which the crimping tool engages a peripheral portion of the top surface of the top food patty in pressure contact and presses that peripheral portion of the top food patty into the bottom food patty with no penetration of the crimping tool into the interior of either party. Drive means, mounted on the frame and connected to the yoke, are provided for driving the yoke reciprocally toward and away from the base during each crimping interval to drive the confinement and crimping tools from their rest positions to their actuated positions and back to their rest positions during the crimping interval.

DETAILED DESCRIPTION OF THE PREFERRED EMBODIMENT

Figures 1, 2, 3:
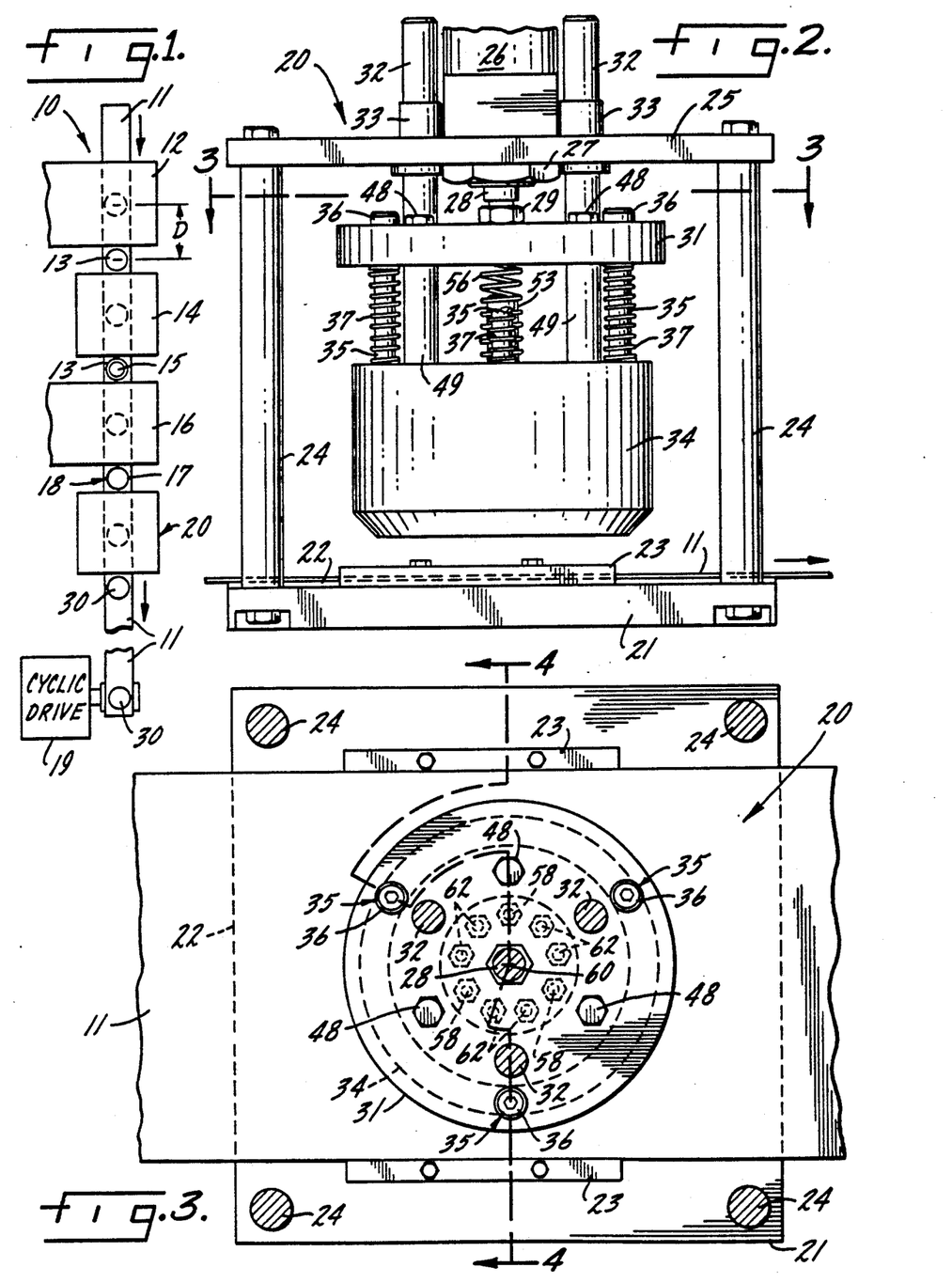
FIG. 1 is a schematic plan view of a food product system that includes a crimping station in which a crimping mechanism according to the present invention may be utilized.
FIG. 2 is a side elevation view of a preferred embodiment of the crimping mechanism of the present invention.
FIG. 3 is a sectional view taken approximately as indicated by line 3—3 in FIG. 2.

FIG. 1 affords a schematic plan view of a food production system 10 that includes a crimping station 20 in which a crimping mechanism constructed in accordance with the present invention may be incorporated. System 10 includes an intermittently, cyclically operated conveyor 11 that extends for the full length of the system. Conveyor 11 is preferably a belt-type conveyor. Starting at the top of FIG. 1, it is seen that conveyor 11 passes through the output end of a food patty molding machine 12. The food patty molding machine 12 is preferably one of the high volume, high capacity Formax machines identified more fully above. In each cycle of the patty molding machine 12 a food patty 13 is produced by the machine and is deposited upon conveyor 11. The timing of operation of conveyor belt 11 is coordinated with the cyclic operation of patty machine 12 so that the belt is stationary whenever a food patty is being produced; belt 11 advances a predetermined distance D during each molding interval when a new patty is being molded in machine 12.

After passing through the output portion of patty molding machine 12, belt conveyor 11 traverses one or more intermediate food layer stations 14. Only one such station 14 is shown in FIG. 1, but there could be two, three, or more intermediate stations. Station 14 applies a layer 15 of some food ingredient to the top of the bottom food patty 13. The food element 15 could be meat of some kind, fish or other seafood, cheese, butter, margarine, catsup, etc.

The mechanisms used in the intermediate layer station or stations 14 in system 10 may be of two general types. If the intermediate layer 15 is to be ham, sausage, or other meat product, or if it is to be a cheese, butter, or margarine station 14 may be a commercial slicer of the kind that ca be controlled so that it releases a slice cut from a sausage or ham segment or from a cheese at a predetermined controllable time interval. Such a slice of an intermediate layer or ingredient should be deposited centrally of the bottom patty 13, as indicated in FIG. 1. A suitable slicing machine for an operation of this kind is the Grote 522 slicer applicator of J. E. Grote Company, Inc., Blacklick, Columbus, Ohio, USA. Station 14 could also be another Formax patty former.

If the material from which the intermediate layer 15 is to be formed is of a flowable or particulate nature, application to the bottom patty 13 by a slicing mechanism is impractical. In situations of that kind, a condiment dispenser such as that described in Jonovic et al. U.S. Pat. No. 4,684,040 may be employed. For either type of machine, deposition of the intermediate layer 15 by station 14 should be timed to occur during those intervals when the intermittent conveyor belt 11 is stationary so that these intermediate layers can be accurately located on bottom patties 13.

After all intermediate layers 15 are in place on bottom patty 13, the subassemblies 13, 15 are advanced, on conveyor belt 11, into the output or discharge portion of a second food patty molding machine 16. Machine 16 is preferably of the identical type with machine 12 and produces a top patty 17 of approximately the same size and configuration. This completes a food assembly 18 that includes the bottom patty 13, the top patty 17, and any intermediate layers or patties 15.

In system 10 of FIG. 1, the next station 20 is a crimping station, constructed in accordance with the present invention, that operates to produce a coherent plural-layer food product 30 from each stack or food assembly 18 entering mechanism 20 on the intermittent conveyor 11. The manner in which the completed coherent food products 30 are transferred away from the system is of no interest in connection with the present invention and hence has not been shown in FIG. 1. A drive 19 for conveyor 11 is illustrated in FIG. 1. The conveyor drive 19 should actuate the conveyor belt to advance it through the distance D each time one of the stations 12, 14 and 16 functions to deposit a new food patty or condiment component on the conveyor belt. Furthermore, the timing of all of the machines in system 10, comprising patty molding machines 12 and 16, intermediate layer machine or machines 14, and crimping mechanism 20, as well as their spacing along conveyor 11, should be coordinated with operation of conveyor drive 19.

As shown in FIGS. 2 and 3, the crimping mechanism incorporated in station 20 comprises a base 21 upon which a base plate 22 is mounted; there are two conveyor guides 23 at opposite sides of base plate 22. Four vertical supports 24 are mounted on and extend upwardly from the base 21 of station 20 and support a relatively heavy plate or frame member 25. Thus, members 24 and 25, together with base 21 afford a rigid, stationary frame for the operating mechanism of crimping station 20.

A power cylinder 26 is mounted on frame member 25 and is secured thereto by a large nut 27 (FIG. 2). Power cylinder 26 has a piston rod 28 that projects downwardly, below frame member 25 and nut 27. The lower end 28A of piston rod 28 is threaded into the center of a yoke 31; a nut 29 is used to adjust the height of yoke 31. Yoke 31 is shown as having a circular configuration. Furthermore, all of the other tooling in crimping station 20 is also shown as being essentially circular in shape, corresponding to an anticipated circular configuration for the top and bottom patties 13 and 17 in the food product 30 produced by station 20. It should be understood that this circular configuration is the preferred one because it minimizes the possibility of orientation error. On the other hand, other shapes (square, hexagonal, octagonal, etc.) may be utilized.

Crimping mechanism 20, FIGS. 2 and 3, includes three yoke guide rods 32 that are affixed to yoke 31 and that extend upwardly from the yoke through individual yoke guide sleeves 33 mounted in the top plate, frame member 25. Rods 32 and sleeves 33 control and guide vertical movements of yoke 31, actuated by power cylinder 26, in the operation of mechanism 20.

The operating mechanism of crimping station 20, FIGS. 2 and 3, further includes a cylindrical confinement tool 34 that is positioned below and suspended from yoke 31. A series of confinement guide rods 35 are fixed to the top of the cylindrical confinement tool 34. The upper portion of each guide rod 35 extends through an aperture in yoke 31, as better shown in FIGS. 4 and 7, with the head 36 of each rod engaging the top of the yoke. There is a spring 37 disposed in encompassing relation to each guide rod 35, between yoke 31 and confinement tool 34.

Figure 4:
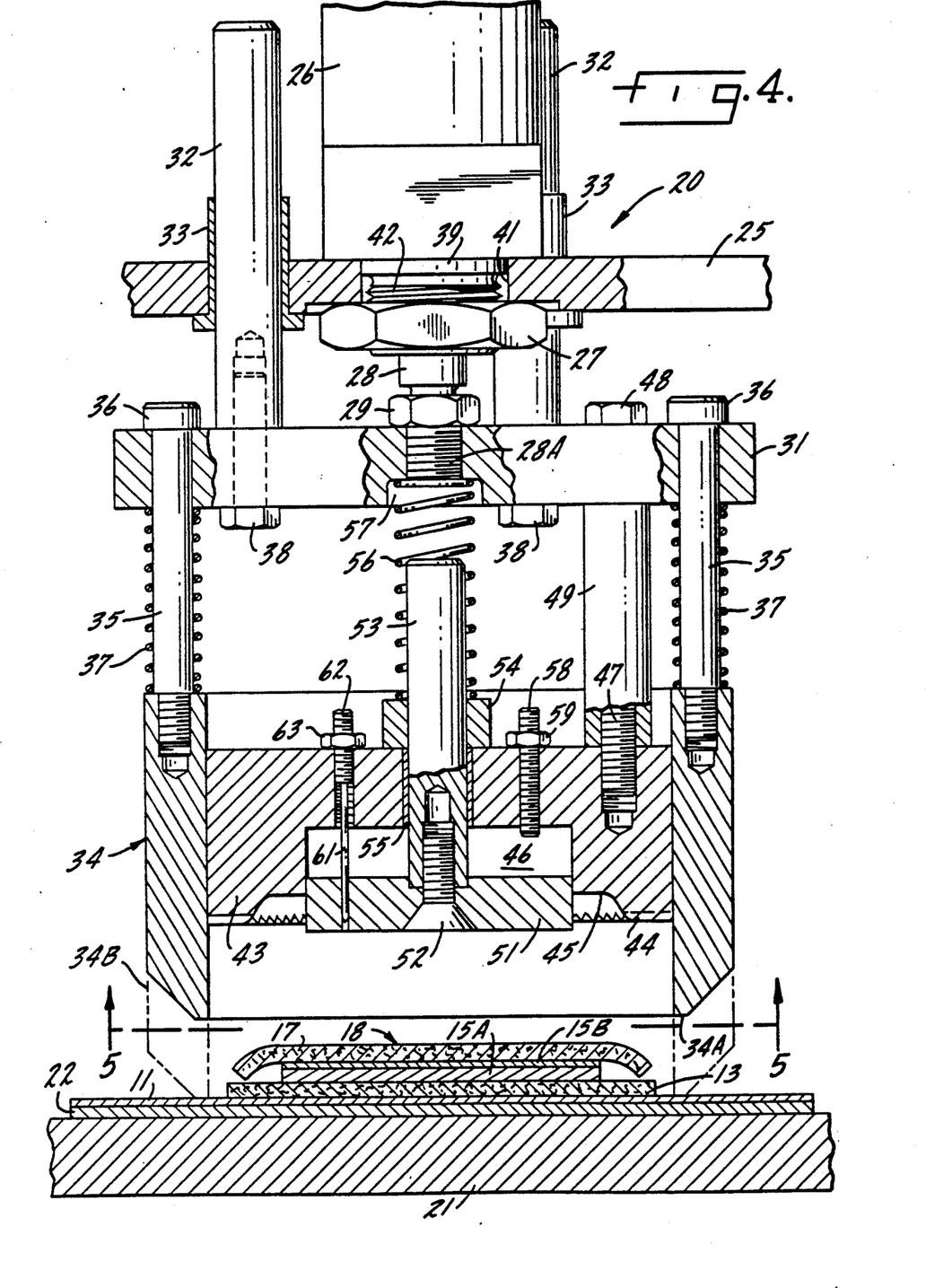
FIG. 4 is a sectional elevation view, on an enlarged scale, taken approximately as indicated by line 4—4 in FIG. 3.
Figure 5:
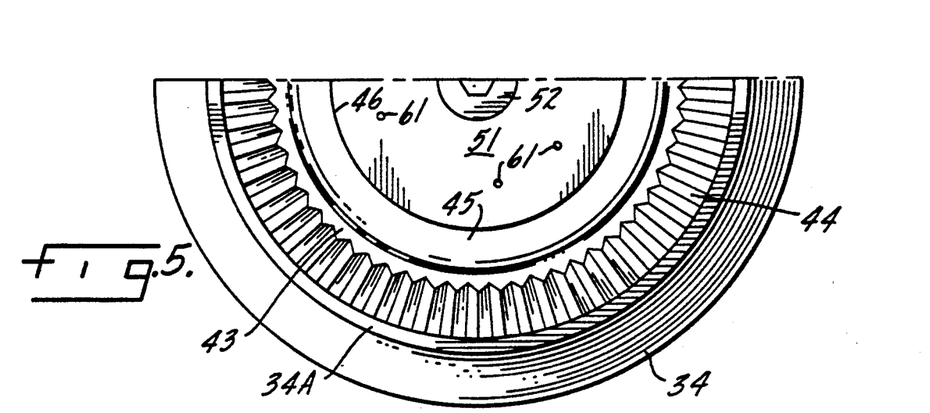
FIG. 5 is a sectional view of one-half of the mechanism of FIG. 4 taken approximately as indicated by line 5—5 in FIG. 4.
Figure 6:
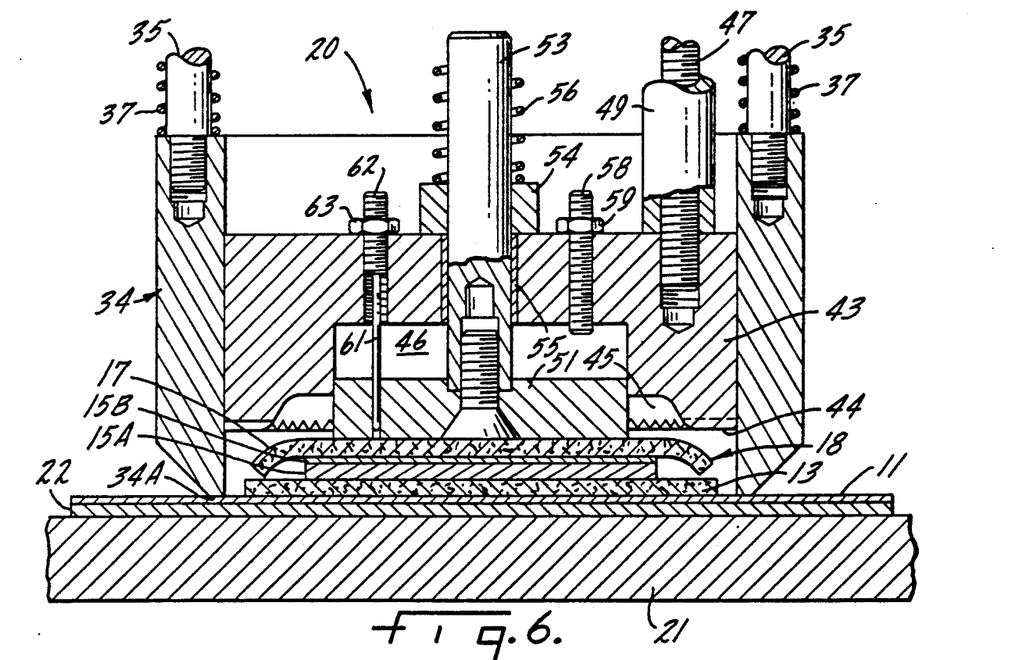
FIG. 6 is a detail sectional view like FIG. 4 but at a later stage in the crimping cycle.
Figure 7:
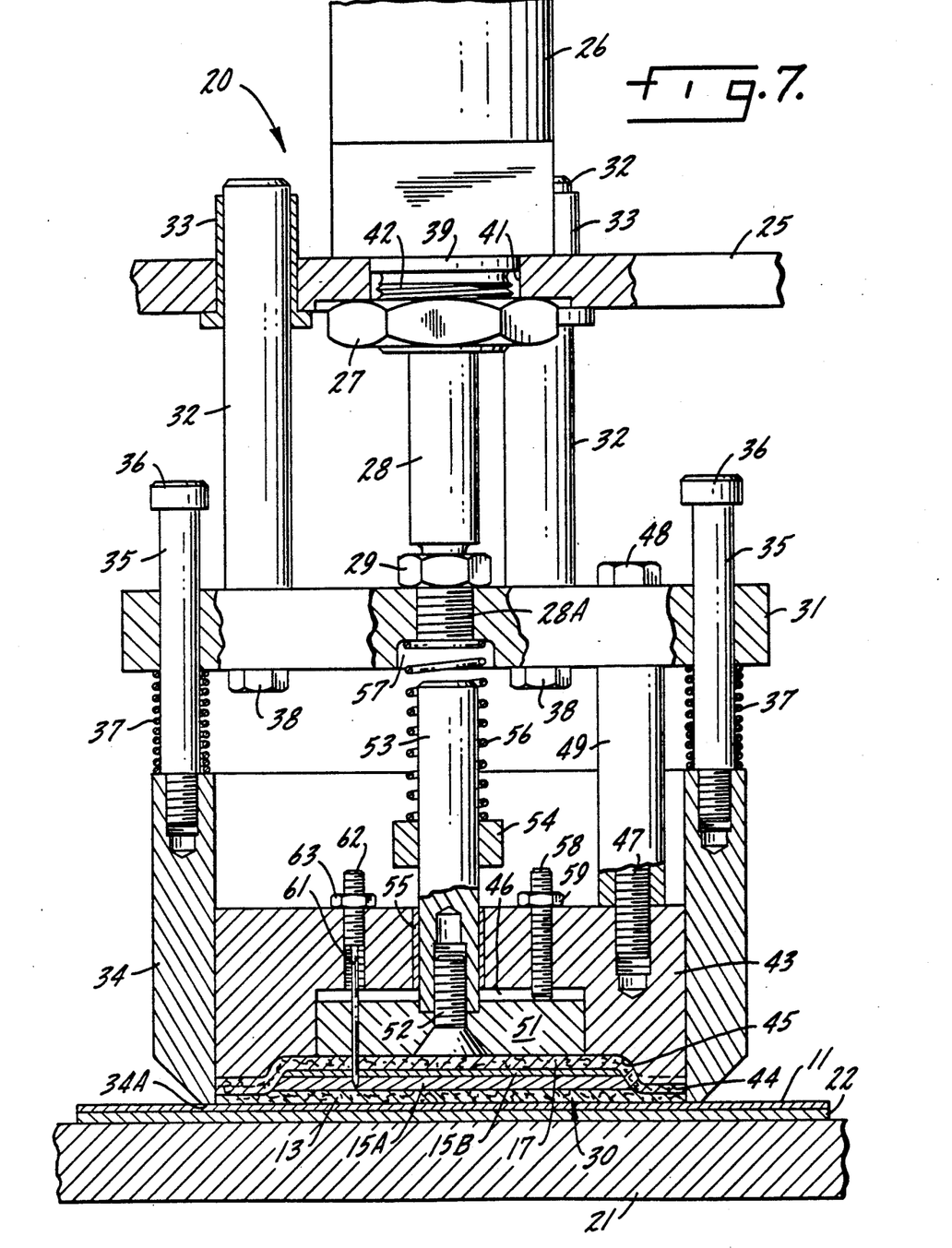
FIG. 7 is a sectional view corresponding to FIG. 4 but with the mechanism in the final stage of its cyclic operation.

FIGS. 4-7 provide more detailed information about the operating mechanism of crimping station 20 (FIGS. 2 and 3) and illustrate components not thus far mentioned that are an integral part of the crimping mechanism. Thus, as shown in FIGS. 4 and 7, each yoke guide rod 32 may be secured to yoke 31 by an appropriate bolt or other fastener 38. The mounting of power cylinder 26 in the plate comprising frame member 25 may comprise a collar 39 that fits closely into an aperture 41 in plate 25. A threaded extension 42 of power cylinder 26 is engaged by nut 27 to complete the mounting for the power cylinder on frame member 25.

Another major component of the crimping mechanism in station 20 is a crimping tool 43, FIGS. 4-7. Crimping tool 43 is of generally inverted cup-shaped configuration, preferably having a downwardly facing serrated rim 44. The lower surface of crimping tool 43 is of steppe configuration, providing an annular recess 45 that extends inwardly from the serrated rim 44 and that leads to a central, deeper recess 46. Crimping tool 43 is suspended from yoke 31 by a plurality of suspension bolts 47 whose heads 48 engage the top of yoke 31 as shown in FIGS. 2-4 and 7. A spacer sleeve 49 encompasses each suspension bolt 47 (FIGS. 4 & 7) to establish the spacing between crimping tool 43 and yoke 31. Each bolt 47 is threaded into a tapped hole in crimping tool 43.

A disk-shaped tamping tool 51 is disposed within the central recess 46 in crimping tool 43. A mounting screw 52 having a head that is flush with the lower surface of the tamping tool extends upwardly through the tamping tool and is threaded into a tapped opening in the bottom of a vertically extending guide rod 53. A guide collar 54 is affixed to the upper portion of guide rod 53, which projects a substantial distance above the top of crimping tool 43. There is a guide bushing 55 in crimping tool 43, through which guide rod 53 extends. See FIGS. 4, 6 & 7. A coil spring 56 is disposed in encompassing relation to the guide rod 53. The bottom of coil spring 56 engages the top of guide collar 54; the upper end of spring 56 is positioned within a recess 57 in the bottom of yoke 31.

There are three small spacer rods 58 in mechanism 20, each threaded into a tapped opening in crimping tool 43 as shown in FIGS. 4, 6 & 7. Each spacer rod 58 projects downwardly into the central recess 46 in the crimping tool to establish an upper limit for movement of tamping tool 51 by engaging the top of the tamping tool. Each spacer rod 58 is held in position by a nut 59. The equiangular distribution of spacer rods 58 about the central axis 60 of the crimping mechanism in station 20 can best be seen in FIG. 3.

There are also six aeration pins 61 in crimping mechanism 20. The location of the aeration pins 61 is best shown in FIG. 3; the pin construction is best shown in FIGS. 4-7. Each pin 61 extends down into a vertical axial opening in tamping tool 51, as shown in FIGS. 4, 6 & 7. The top portion of each pin 61 is a threaded rod 62 that is threaded into a tapped opening in crimping tool 43 and held in place, vertically, by a nut 63.

In considering the operation of the crimping mechanism 20 of FIG. 2-7, the starting point is the operating condition for the mechanism and the rest positions for the various tools of that mechanism, as shown in FIGS. 2-5. As will be apparent from the foregoing description, yoke 31 is suspended from member 25 of the frame at crimping station 20, being suspended from the lower, threaded end 28A of the piston rod 28 of power cylinder 26, which in turn is affixed to frame member 25. The elevated, rest position for yoke 31 is shown in FIGS. 2-4. Yoke 31 is movable vertically, with its movement guided by rods 32, in response to operation of power cylinder 26.

Each of the principal tools in crimping mechanism 20 has an elevated rest position (FIGS. 2-5) and an actuated position. The elevated rest position for crimping tool 34 is shown in FIGS. 2-5; for this position, the lower rim 34A of the crimping tool is displaced a substantial distance above the top surface of conveyor belt 11. The actuated position for confinement tool 34 is illustrated in FIGS. 6 and 7. For tamping tool 51, the elevated rest position is also shown in FIG. 4. The actuated position for tamping tool 51, which is a part of the air release apparatus of crimping station 20, is shown in FIG. 6; the tamping tool also occupies the same actuated position in FIG. 7.

Crimping tool 43, on the other hand, starting from its elevated rest position in FIG. 4, has not completed its downward movement by the time the mechanism reaches the stage shown in FIG. 6. Thus, in FIG. 6 crimping tool 43 is at an intermediate location between its rest position (FIG. 4) and its actuated position, shown in FIG. 7. This applies also to the pins 61, which are affixed to crimping tool 43 and move conjointly with it.

Figure 8:
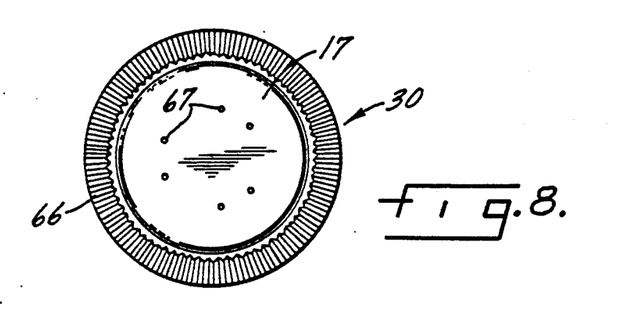
FIG. 8 is a plan view of a finished food product made in the mechanism of the invention, on the same scale as FIGS. 2 and 3.

Starting with FIGS. 4 and 5, it is seen that the food assembly 18, including its bottom patty 13 and top patty 17, is positioned in centered relation within crimping mechanism 20 immediately below the central opening in the cylindrical crimping tool 43. See also FIG. 1. When food assembly 18 reaches that crimping position, movement of belt conveyor 11 is interrupted. Belt 11 then maintains food assembly 18 in the crimping position shown in FIGS. 4–7 for a predetermined crimping interval, during which mechanism 20 operates to crimp the lower and upper patties 13 and 17 together to complete a coherent plural-layer food product 30 (FIG. 8).

With food assembly 18 in the crimping position in mechanism 20, power cylinder 26 is actuated to drive piston rod 28, 28A downwardly, moving yoke 31 downwardly away from the fixed frame member 25. In the course of this movement, the confinement tool 34 that is suspended from yoke 31 on rod 35 is shifted downwardly so that its lower rim 34A engages the top surface of conveyor belt 11. This does no harm to the conveyor, because the conveyor belt is not moving. The actuated position for confinement tool 34 is shown by phantom outline 34B in FIG. 4 and is shown in solid lines in FIGS. and 7. In its actuated position, FIGS. 6 and 7, confinement tool 34 encompasses the crimping position occupied by food assembly 18 and establishes limits beyond which the food assembly cannot expand when tamped and crimped to complete the food product 30 as described below.

After confinement tool 34 reaches its actuated position, continued downward movement of piston rod 28 and the resulting downward movement of yoke 31 cause crimping tool 43 and the air release means associated with that crimping tool to move downwardly relative to confinement tool 34, compressing springs 37 on guide rods 35. The next stage in the overall operation of mechanism 20 is that shown in FIG. 6, in which tamping tool 51 engages the upper surface of the top food patty 17 of assembly 18. From the point shown in FIG. 6, only a quite limited downward movement of tamping tool 51 remains possible, and this limited movement squeezes air out of food assembly 18. That is, tamping tool 51 is a part of an air release means, incorporated in mechanism 20, for reducing entrapped air between the top and bottom food patties 17 and 13 in the finished food product 30 (FIG. 8) to be made from assembly 18.

Power cylinder 26 remains actuated and continues to drive completing the yoke 31 downwardly to the level illustrated in FIG. 7. This drives crimping tool 43 all the way to its actuated position, in which the rim 44 of the crimping tool presses a peripheral portion of the top food patty 17 down into the corresponding portion of the bottom food patty 13, sealing the top and bottom food patties 17 and 13 together. With the illustrated food assembly 18, of course, this seals the intermediate ham and cheese layers 15A and 15B into the interior of the completed food product 30. All layers may be spread out in the tamping/crimping process. The overall configuration of the completed food product 30 is shown in FIG. 8, with a serrated edge 66. For some food products it is not necessary to have a serrated rim 44 on crimping tool 43; a smooth crimp rim on the final food product may be adequate. In the final movement of crimping tool 43 to the actuated position of FIG. 7, pins 61 are also driven downwardly through the central portion of the food assembly. Preferably, the pin lengths are such that the bottom end of each pin is interrupted in its downward movement at a point approximately coincident with the upper surface of the bottom patty 13; see FIG. 7. However, this relationship is not critical. The purpose of pins 61 is to release additional air from within the finished product 30 (FIG. 8) through holes 67 formed by pins 61.

When the coherent, sealed food product has been completed, at the stage shown in FIG. 7, power cylinder 26 is reversed in its operation to pull piston rod 28 and yoke 31 back to their original positions as shown in FIG. 4. As yoke 31 begins its upward movement from the position of FIG. 7 to that shown in FIG. 4, springs 37 and 56 operate to restore the original spacings between the components of mechanism 20 so that the mechanism is restored to the rest condition shown in FIG. 4. At this point, which marks the completion of the required crimping interval, conveyor belt 11 is again stepped to advance the belt through system 10 (FIG. 1) by the distance D and the crimping cycle is repeated.

I claim:

1. A crimping mechanism for a crimping station producing a coherent plural-layer food product from a food assembly, the food assembly including at least a bottom food patty and a top food patty covering and supported by the bottom food patty, each patty formed at meat, poultry, or fish, comprising:
   intermittently operable food assembly positioning means for positioning a food assembly in a crimping position in a crimping station and maintaining the food assembly stationary in that crimping position for a predetermined crimping interval;
   confinement means for defining peripheral limits for a food product at the crimping position, the confinement means comprising a confinement tool movement between a rest position displaced from the crimping position and an actuated position encompassing the crimping position;
   crimping means for crimping peripheral portions of the top and bottom food patties of the food assembly together, at the crimping position, the crimping means comprising a crimping tool movable between a rest position displaced from the food assembly crimping position and an actuated position in which the crimping tool engages a peripheral portion of the top surface of the top food patty in pressure contact, and presses that peripheral portion of the top food patty into the bottom food patty, with no penetration of the crimping tool into the interior of either patty;
   and drive means for driving the confinement and crimping tools from their rest positions to their actuated positions and back to their rest positions during the crimping interval.

2. A crimping mechanism for producing a coherent plural-layer food product, according to claim 1, in which the food assembly positioning means is a cyclically driven conveyor having successive dwell intervals each corresponding to the crimping interval.

3. A crimping mechanism for producing a coherent plural-layer food product, according to claim 2, in which:
the cyclically driven conveyor is a belt type conveyor extending through the crimping station; and
the crimping mechanism further comprises a fixed base, located beneath and supporting a portion of the belt conveyor at the crimping position.

4. A crimping mechanism for producing a coherent plural-layer food product, according to claim 3, in which movements of the confinement and crimping tools, between their rest and actuated positions, are all in a direction approximately normal to a plane occupied by a portion of the belt conveyor extending through the crimping station.

5. A crimping mechanism for producing a coherent plural-layer food product, according to claim 1 and further comprising:
air release means for reducing entrapped air between the top and bottom food patties of the food product.

6. A crimping mechanism for producing a coherent plural-layer food product, according to claim 5, in which:
the food assembly positioning means is a cyclically driven belt-type conveyor extending through the crimping station;
the crimping mechanism further comprises a fixed base, located beneath and supporting a portion of the bet conveyor at the crimping position; and
movements of the confinement and crimping tools, between their rest and actuated positions, are in a direction approximately normal to a plane occupied by a portion of the belt conveyor extending through the crimping station.

7. A crimping mechanism for producing a coherent plural-layer food product, according to claim 5, in which:
the air release means comprises a tamping tool movable between a rest position displaced from the crimping position and an actuated position in which the tamping tool engages an appreciable area of the central top surface of the top patty and presses the central portion of the top patty toward the bottom patty to reduce air entrapped therebetween; and
the drive means drives the tamping tool from its rest position to its actuated position and back to its rest position during the crimping interval.

8. A crimping mechanism for producing a coherent plural-layer food product, according to claim 7, in which:
the food assembly positioning means is a cyclically driven belt-type conveyor extending through the crimping station;
the crimping mechanism further comprises a fixed base, located beneath and supporting a portion of the belt conveyor at the crimping position; and
movements of the confinement, crimping, and tamping tools, between their normal and actuated positions, are all in a direction approximately normal to a plane occupied by a portion of the belt conveyor extending through the crimping station.

9. A crimping mechanism for producing a coherent plural-layer food product, according to claim 5, in which:
the air release means comprises a plurality of pins each movable between a rest position displaced from the crimping position and an actuated position in which the pin extends through the top patty to the bottom patty; and
the drive means drives the pins from their rest positions to their actuated positions and back to their rest positions during the crimping interval.

10. A crimping mechanism for producing a coherent plural-layer food product, according to claim 9, in which:
the food assembly positioning means is a cyclically driven belt-type conveyor extending through the crimping station;
the crimping mechanism further comprises a fixed base, located beneath and supporting a portion of the belt conveyor at the crimping position; and
movements of the confinement and crimping tools and the air release pins, between their rest and actuated positions, are all in a direction approximately normal to a plane occupied by a portion of the belt conveyor extending through the crimping station.

11. A crimping mechanism for producing a coherent plural-layer food product, according to claim 7, in which:
the air release means comprises a plurality of pins each movable between a rest position displaced from the crimping position and an actuated position in which the pin extends through the top patty to the bottom patty; and
the drive means drives the pins from their rest positions to their actuated positions and back to their rest positions during the crimping interval.

12. A crimping mechanism for producing a coherent plural-layer food product, according to claim 11, in which:
the food assembly positioning means is a cyclically driven belt-type conveyor extending through the crimping station;
the crimping mechanism further comprises a fixed base, located beneath and supporting a portion of the belt conveyor at the crimping position; and
movements of the confinement, crimping, and tamping tools and the air release pins, between their rest and actuated positions, are all in a direction approximately normal to a plane occupied by a portion of the belt conveyor extending through the crimping station.

13. A crimping mechanism for producing a coherent plural-layer food product, according to claim 1, in which the crimping tool and the confinement tool are both of closed configuration, encompassing the crimping position, the crimping tool being disposed within the confinement tool.

14. A crimping mechanism for producing a coherent plural-layer food product, according to claim 13, in which the crimping tool and the confinement tool have the same configuration and the crimping tool fits closely within the confinement tool.

15. A crimping mechanism for producing a coherent plural-layer food product, according to claim 13, in which both the crimping tool and the confinement tool are of symmetrical configuration.

16. A crimping mechanism for producing a coherent plural-layer food product, according to claim 13, in which the crimping tool has a serrated rim that engages the top patty of the food assembly.

17. A crimping mechanism for producing a coherent plural-layer food product, according to claim 1, in which the crimping tool has a serrated rim that engages the top patty of the food assembly.

18. A crimping mechanism for producing a coherent plural-layer food product, according to claim 17 and further comprising:
  air release means for reducing entrapped air between the top and bottom food patties of the food product.

19. A crimping mechanism for producing a coherent plural-layer food product, according to claim 18, in which:
  the air release means comprises a tamping tool movable between a rest position displaced from the crimping position and an actuated position in which the tamping tool presses the central portion of the top patty toward the bottom patty to reduce air entrapped therebetween; and
  the drive means drives the tamping tool from its rest position to its actuated position and back to its rest position during the crimping interval.

20. A crimping mechanism for producing a coherent plural-layer food product, according to claim 18, in which:
  the air release means comprises a plurality of pins each movable between a rest position displaced from the crimping position and an actuated position in which the pin extends through the top patty to the bottom patty; and
  the drive means drives the pins from their rest positions to their actuated positions and back to their rest positions during the crimping interval.

21. A crimping mechanism for producing a coherent plural-layer food product, according to claim 19, in which:
  the air release means comprises a plurality of pins each movable between a rest position displaced from the crimping position and an actuated position in which the pin extends through the top patty to the bottom patty; and
  the drive means drives the pins from their rest positions to their actuated positions and back to their rest positions during the crimping interval.

22. A crimping mechanism for a crimping station producing a coherent plural-layer food product from a food assembly, the food assembly including at least a bottom food patty and a top food patty covering and supported by the bottom food patty, each patty formed of meat, poultry, or fish, comprising:
  a fixed base, located at the crimping station;
  intermittently operable food assembly positioning means for positioning a food assembly in a crimping position on the crimping station base and maintaining the food assembly stationary in that crimping position for a predetermined crimping interval, the food assembly positioning means comprising a cyclically driven belt-type conveyor extending across the base through the crimping station;
  a fixed frame member positioned above the crimping position in the crimping station;
  a yoke, suspended from the frame member and movable toward and away from the crimping position;
  confinement means for defining peripheral limits for a food product at the crimping position, the confinement means comprising a confinement tool suspended from the yoke and movable toward and away from the base between a rest position displaced from the crimping position and an actuated position encompassing the crimping position;
  crimping means for crimping peripheral portions of the top and bottom food patties of the food assembly together, at the crimping position, the crimping means comprising a crimping tool suspended from the yoke and movable toward and away from the base between a rest position displaced from the food assembly crimping position and an actuated position in which the crimping tool engages a peripheral portion of the top surface of the top food patty in pressure contact, and presses that peripheral portion of the top food patty into the bottom food patty, with no penetration of the crimping tool into the interior of either patty;
  and drives means, mounted on the frame and connected to the yoke, for driving the yoke reciprocally toward and away from the base during each crimping interval to drive the confinement and crimping tools from their rest positions to their actuated positions and back to their rest positions during the crimping interval.

23. A crimping mechanism for producing a coherent plural-layer food product, according to claim 22, in which the crimping tool and the confinement tool are both of closed configuration, encompassing the crimping position, the crimping tool being disposed within the confinement tool.

24. A crimping mechanism for producing a coherent plural-layer food product, according to claim 23, in which the crimping tool has a serrated rim that engages the top patty of the food assembly.

25. A crimping mechanism for producing a coherent plural-layer food product, according to claim 22, in which:
  the drive means comprises a fluid pressure operated drive cylinder mounted on the frame member above the crimping position and a piston rod, projecting from the drive cylinder, connected to the yoke; and
  the mechanism further comprises a plurality of yoke guide rods, interconnecting the frame and the yoke, to guide movements of the yoke.

26. A crimping mechanism for producing a coherent plural-layer food product, according to claim 25, in which the crimping tool and the confinement tool are both of closed configuration, encompassing the crimping position, the crimping tool being disposed within the confinement tool.

27. A crimping mechanism for producing a coherent plural-layer food product, according to claim 26, in which the crimping tool has a serrated rim that engages the top patty of the food assembly.

28. A crimping mechanism for producing a coherent plural-layer food product, according to claim 25, and further comprising:
  a plurality of confinement guide rods each affixed to the confinement tool and extending through the yoke, suspending the confinement tool from the yoke,
  and a corresponding plurality of confinement tool return springs each encompassing one confinement guide rod between the yoke and the confinement tool.

29. A crimping mechanism for producing a coherent plural-layer food product, according to claim 22, and further comprising:
   air release means for reducing entrapped air between the top and bottom food patties of the food product.

30. A crimping mechanism for producing a coherent plural-layer food product, according to claim 29, in which:
   the air release means comprises a tamping tool movable between a rest position displaced from the crimping position and an actuated position in which the tamping tool presses the central portion of the top patty toward the bottom patty to reduce air entrapped therebetween; and
   the drive means drives the tamping tool from its rest position to its actuated position and back to its rest position during the crimping interval.

31. A crimping mechanism for producing a coherent plural-layer food product, according to claim 29, in which:
   the air release means comprises a plurality of pins mounted in the crimping tool and each movable between a rest position displaced from the crimping position and an actuated position in which the pin extends through the top patty to the bottom patty; and
   movement of the crimping tool drives the pins from their rest positions to their actuated positions and back to their rest positions during the crimping interval.

32. A crimping mechanism for producing a coherent plural-layer food product, according to claim 31, in which:
   the air release means comprises a tamping tool movable between a rest position displaced from the crimping position and an actuated position in which the tamping tool engages an appreciable area of the central top surface of the top patty and presses the central portion of the top patty toward the bottom patty to reduce air entrapped therebetween; and
   the drive means drives the tamping tool from its rest position to its actuated position and back to its rest position during the crimping interval.

33. A crimping mechanism for producing a coherent plural-layer food product, according to claim 32, in which the crimping tool has a serrated rim that engages the top patty of the food assembly.

* * * * *